United States Patent [19]

Kurtz et al.

[11] Patent Number: 4,695,817
[45] Date of Patent: Sep. 22, 1987

[54] ENVIRONMENTALLY PROTECTED PRESSURE TRANSDUCERS EMPLOYING TWO ELECTRICALLY INTERCONNECTED TRANSDUCER ARRAYS

[75] Inventors: Anthony D. Kurtz, Teaneck; Joseph R. Mallon, Franklin Lakes, both of N.J.

[73] Assignee: Kulite Semiconductor Products, Inc., Ridgefield, N.J.

[21] Appl. No.: 748,836

[22] Filed: Jun. 26, 1985

[51] Int. Cl.[4] ............................................. G01L 1/22
[52] U.S. Cl. ......................................... 338/4; 338/5; 338/42
[58] Field of Search .......................... 338/4, 5, 42, 36; 73/721, 720, 716, 715

[56] References Cited

U.S. PATENT DOCUMENTS

| | | | |
|---|---|---|---|
| 4,092,662 | 5/1978 | Daughton | 338/9 X |
| 4,222,277 | 9/1980 | Kurtz et al. | 338/4 X |
| 4,287,501 | 9/1981 | Tominaga et al. | 338/4 X |
| 4,321,578 | 3/1982 | Nagasu et al. | 338/4 X |
| 4,395,915 | 8/1983 | Singh | 338/4 X |

Primary Examiner—E. A. Goldberg
Assistant Examiner—M. M. Lateef
Attorney, Agent, or Firm—Arthur L. Plevy

[57] ABSTRACT

A transducer employs two separate pressure input ports. Each port is associated with a separate metal diaphragm behind which diaphragm is secured a transducer structure having a cup-shaped silicon pressure diaphragm which is retained within a hollow of the transducer which is oil filled. One transducer structure is a half bridge array and monitors the main pressure applied to the positive port. A full bridge is formed by two resistors associated with the positive port and two resistors in an array associated with the other port which is the negative port. The resistors in the array at the negative port are selected to be larger in magnitude than those at the positive port and exhibit a greater sensitivity per unit of applied pressure. By selecting the magnitudes of the resistors associated with each port as well as the sensitivity, the shunting of resistors at each port will cause the composite transducer to provide an output which is indicative of the pressure applied to the positive port as modified or corrected by the pressure applied to the negative port.

24 Claims, 6 Drawing Figures

ENVIRONMENTALLY PROTECTED PRESSURE TRANSDUCERS EMPLOYING TWO ELECTRICALLY INTERCONNECTED TRANSDUCER ARRAYS

BACKGROUND OF THE INVENTION

This invention relates to pressure transducers in general and more particularly to an environmentally protected pressure transducer configuration which employs interconnected or shunted resistive bridge arrays for providing a pressure output indicative of a pressure relationship between two different pressure ports.

Pressure transducers have been utilized in many applications whereby the external environment imposes difficult operating conditions for the transducer structure. Such transducers, for example, have been employed in aircraft, automobiles and other vehicles. In such units the transducer is constantly exposed to moisture, fuel, solvents, hydraulic fluids and the elements in general. These transducers are associated with pressure ports as well as with internal cavities. During such operation, the cavities as well as the ports may accumulate excessive amounts of water. This water can harm the silicon or metallic elements employed in conventional transducers. Metal diaphragms are often employed either as isolation diaphragms or with strain gages mounted on the interior surface of the diaphragm to provide the required media isolation. Such an approach is entirely satisfactory for absolute or sealed gage transducers, however, for gage or differential transducers, severe problems arise.

For a device with strain gages on a metal diaphragm, the gages are exposed to the reference environment in such transducers. Various techniques, including coating with organics, have been tried but none have been found to offer full protection. Metal isolation using sensor capsules in a sealed cavity device pose another problem. Such devices employ a contained volume of oil which must be hermetically sealed within the pressure cavity. Such a seal is difficult to obtain in a gage sensor employing a silicon diaphragm. It is very difficult to form a hermetic and stress free seal for a silicon diaphragm sensor. Thus water and other deleterious substances may render the device inaccurate or actually destroy the piezoresistive elements or interconnecting metallizations which are intimately associated with the transducers used in these applications.

In transducers used for such applications the devices employed may constitute gage or differential pressure transducers requiring two separate ports such as a pressure input port and a negative pressure or reference port. A single diaphragm may be employed with the positive pressure applied on one side of the diaphragm and the gage or reference pressure applied on the second side of the diaphragm. Thus, the device responds to the difference between the pressure applied to the positive side and the pressure applied to the negative side of the diaphragm. This invention employs two absolute pressure sensors each with a sealed vacuum reference. One transducer is exposed to the pressure to be measured and one transducer is exposed to a reference pressure. The outputs from the transducer elements of such devices must be tailored to provide a linear output for a unit of applied pressure. In order to add the outputs and to provide compensation, additional circuitry such as operational amplifiers, resistive compensation techniques and so on must be employed. Such additional components as were intimately associated with the transducer stucture were also subject to destruction and contamination by the external environment. External or internal active components in general do a less than ideal job of integrating two transducers into a single differential or gage unit.

As can be ascertained, many different industries such as the aircraft industry as well as others require gage pressure transducers. These devices have an output which is referenced to atmospheric pressure or where the output is referenced to a second reference pressure which again may be atmospheric pressure or another time varying reference pressure. As such, differential pressure measurements can be accomplished by many different transducer structures.

One such structure is a differential transducer which provides an output which is the difference between two pressures. In the case of a gage sensor, one of these pressures, referred to here as the reference pressure, is atmospheric pressure and the other pressure is the pressure being monitored or the measured pressure. Essentially, a gage transducer produces an output which is the difference between atmospheric pressure and a monitored pressure. In the case of absolute pressure transducers, the output is directly indicative of the monitored pressure as referenced to vacuum. Essentially, as is well known, many of such transducers employ piezoresistive sensors. These sensors are usually arranged in a bridge pattern of resistors which are mounted or diffused on a thin diaphragm member. The diaphragm member which may be fabricated from silicon flexes upon application of pressure thereto causing fiber stresses on the top surface which elongate or shorten the piezoresistors causing them to vary their resistance according to the deflection of the diaphragm. In regard to such devices, one may use a single diaphragm where one side of the diaphragm is exposed to a first pressure and the other side of the diaphragm is exposed to a second pressure. It is, of course, understood that in such devices the diaphragm will have the piezoresistive pattern arranged on one side, and, therefore, the pattern will be exposed to either the measured pressure or the reference pressure or atmospheric pressure which may serve to alter undesirably the characteristics of the piezoresistors or otherwise affect their operation.

Silicon diaphragm sensors in general have a robust side and non-robust side. The side with the piezoresistors is sensitive to many environments such as moisture and must be suitably protected. Many schemes have been used for protection but most are imperfect and introduce various problems. In general the best protection is provided by a metal isolation diaphragm coupling the pressure through a fluid transmitting medium. Such an approach introduces two problems, both of which are solved by this invention. The first problem is that it is difficult to make a gage or differential transducer using such an approach. This is because the oil must be sealed in an absolutely hermetic manner. Such a seal is difficult to accomplish with a silicon chip. The second problem is that the trapped oil expands and causes an unwanted pressure signal. This problem is solved by novel interconnection circuits.

In order to avoid this, the prior art employed two separate transducers, each of which was associated with its own pressure port or aperture. Each of these devices contained a separate bridge which, therefore, produced a voltage output proportional to the pressure at each of the respective ports. In order to obtain a proper voltage output, the separate bridge outputs had to be combined by means of electronic circuitry such as suitable operational amplifiers, impedance networks, and so on to derive a voltage which indicated a pressure at one port in relation to the pressure at the other port. These circuits are relatively complicated and include many different components to derive the final output voltage. Prior art devices employing dual diaphragms have been found to be uneconomical and not suitable for aircraft applications.

An additional consideration, in regard to these prior art techniques is that the use of additional circuit components to derive the desired voltage further resulted in complicated compensation techniques which created additional problems. Certain other approaches to the problem utilized a half bridge configuration from each of two separate transducers to derive an absolute pressure output from two separate diaphragm structures. An example of such a device may be had by referring to U.S. Pat. No. 4,222,277 entitled MEDIA COMPATIBLE PRESSURE TRANSDUCER, issued on Sept. 16, 1980 to Anthony D. Kurtz and Joseph R. Mallon, Jr. and assigned to the assignee herein.

In this patent there is shown an absolute pressure transducer which contains two separate sensor configurations on a common diaphragm. The device is suitable for measuring a benign pressure with reference to a relatively corrosive pressure. The top surface of the wafer is exposed to a relatively clean source of pressure while the gage sensor portion of the diaphragm responds to two sources of pressure. The gage configurations associated with each of the diaphragm sections are then coupled together to form a full bridge array. The full bridge is implemented by a half bridge array used from each separate sensor configuration. Essentially, the structure shown provides a reduced output as a half bridge provides half the output of a full bridge configuration. This device is not suitable for applications where both the ports must be exposed to a difficult medium. It requires at least one relatively clean port. Thus in many of the prior art approaches, a half bridge configuration was employed on each of two separate sensors and then the half bridge structures were wired to produce a full bridge output.

It is desirable to utilize a full bridge array to respond to relatively high pressures and to obtain a maximum output in regard to such pressures. One of the embodiments to be described provides a full bridge sensor at the positive port allowing twice the output obtainable from a half bridge transducer.

An additional consideration, apart from the above noted problems is the further fact that such transducers which essentially reference two different pressure sources must generally contain a pressure transmitting fluid such as oil which fluid must be isolated from the pressure transmitting environment and which environment must be isolated from the semiconductor transducer.

It is an object of the present invention to provide an environmentally compensated pressure transducer structure which structure prevents contamination of the transducer sensor elements. This invention seeks to provide a mechanical structure which is practical and economical for implementation into a transducer suitable for aircraft or general purpose measurement. Dual diaphragm transducers of previous art were impractical because of their expensive and bulky design and because of the difficulty of interconnecting two transducers to form a single transducer of high accuracy.

It is, therefore, an object of the present invention to utilize a full bridge arrangement which full bridge arrangement is capable of monitoring variations in a pressure source of a relatively large magnitude. In order to provide a transducer which will correct for an ambient pressure, the full bridge arrangement has at least two of its resistors responsive to pressure input to the positive port and two of its resistors responsive to pressure applied to the negative port which may monitor an ambient pressure such as atmospheric pressure. In this manner, the magnitude of the resistors in the half bridge array are selected such that the combined output from the bridge structure will produde a voltage which is indicative of the pressure applied to the full bridge array as modified by the ambient pressure as applied to the half bridge array.

BRIEF DESCRIPTION OF THE PREFERRED EMBODIMENT

A pressure transducer apparatus of the type containing first and second transducer structures each coupled to a separate pressure port with each transducer having a deflectable diaphragm behind which is mounted a biased pressure sensitive transducer structure for providing a voltage output according to the magnitude of a pressure applied to the associated port, the improvement in combination therewith of apparatus for providing an output voltage indicative of the pressure at said first port as referenced to said second port, comprising a half or full Wheatstone bridge array mounted behind said first diaphragm and having resistive arms with said array coupled between a bias source and with the midpoints of one or both sides capable of providing a voltage according to a pressure variation applied to said diaphragm, a second bridge array mounted behind said second diaphragm and having resistive arms, with at least two resistors in corresponding arms each connected to the first array and sharing said bias voltage and providing a voltage value according to both the pressures applied to both said first and said second ports whereby the voltage at said output is indicative of the pressure applied to said first port as referenced to said second port.

DETAILED DESCRIPTION OF THE FIGURES

Figure 1:
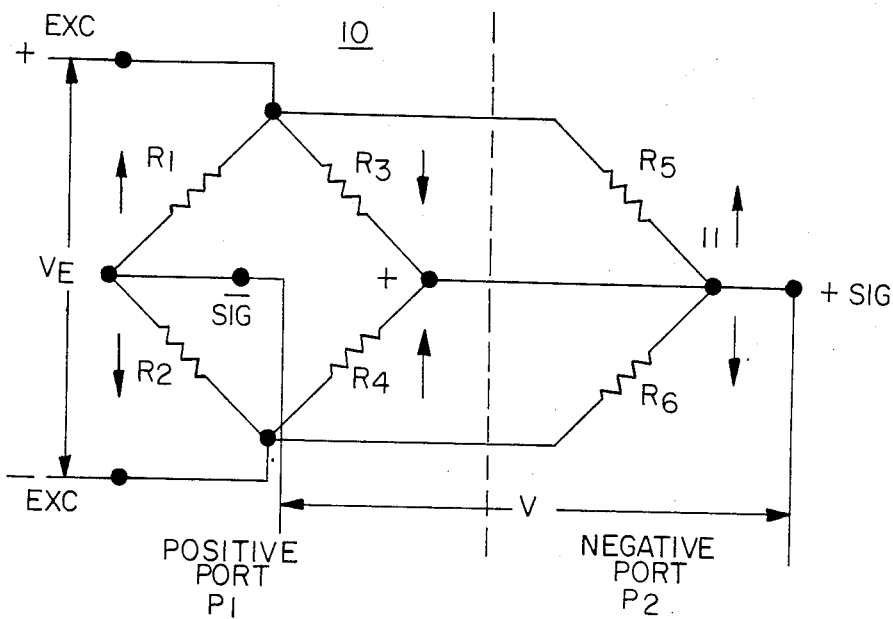
FIG. 1 is a circuit schematic diagram showing a shunted bridge array according to this invention.

Referring to FIG. 1, there is shown a schematic diagram of a pressure transducer structure according to this invention.

Essentially, as can be seen from FIG. 1, on the left hand side there is a full bridge array 10. This bridge array, as will be explained, is located on a separate transducer structure and is associated with a separate diaphragm and is responsive to a separate pressure directed to from a separate pressure port, usually the positive or measured port. The bridge 10, as indicated, is a full Wheatstone bridge or a full bridge array consisting of four resistors designated as R1 to R4. A second half bridge is connected in such a way as to shunt resistors R3 and R4.

For purposes of explanation and ease of explaining operation, the bridge 10 has four arms where R1 is in the first arm, R2 is in the second arm, and so on. The bridge has two sides, a left side consisting of R1 and R2 and a right side consisting of R3 and R4. As shown in FIG. 1, the bridge 10 has a biasing source designated +EXC and −EXC respectively for plus and minus voltage bias applied between the sides of the bridge and designated as +V AND −V. The outputs of the bridge are taken from the junctions between the arms of the bridge as for example the negative signed output is taken from the junction between R1 and R2 while the positive output is taken from the junction between R3 and R4. The full bridge array 10 is subjected to the pressure applied to the positive port of the pressure transducer.

Essentially, such transducers have to be corrected for ambient pressure. The positive port is the port which is exposed to the source of pressure to be monitored. For example, this may be oil or fuel pressure in an automobile or hydraulic pressure in an aircraft or some other pressure of a relatively high value.

As can be seen from FIG. 1, the resistors R3 and R4 which are in the right arm of the full bridge 10 are shunted by resistors R5 and R6. These resistors, as will be explained, are mounted on a separate diaphragm and constitute a half bridge array whereby the separate diaphragm is exposed to an ambient or a reference pressure such as an atmospheric pressure. The resistors R5 and R6 are arranged or configured in a half bridge array having two arms and one side. Arrows shown adjacent the bridge arms indicate the response of an array to a pressure applied to the port or associated with a given port.

As can be seen from FIG. 1, resistor R5 appears in parallel with resistor R3, while resistor R6 is in parallel with resistor R4. The positive output of the bridge is obtained from the center lead 11 completing the parallel circuit. As shown in FIG. 1, the half bridge array is subject to pressure P2 at the negative port of the transducer which may be atmospheric pressure or some other source of reference pressure. In such a transducer the output voltage between the positive and the negative terminals of the transducers should be indicative of the pressure applied to the positive port as referenced to the pressure applied to the negative port. For example, assume that the transducer is selected to monitor a pressure of 100 psig or 115 psia assuming an atmospheric pressure of 15 psia which is impressed upon the positive port and hence is the pressure applied to the full bridge array 10. The designation psig indicates a pressure which is referenced to ambient or atmospheric pressure.

The pressure applied to the negative port would be atmospheric pressure which, for example, is approximately 15 psi and varies with barometric and altitude changes. Hence upon application of a pressure of 100 psig or 115 psia to the positive port and 15 psia to the negative port, the output voltage from the transducer should be indicative of 100 psi. Assume the pressure at the positive port does not change and that it remains at 115 psia and that the pressure at the negative port goes from 15 psi to 14 psi. In this condition one would desire the output voltage to be indicative of a pressure change of +1 psi. Hence the output voltage for this condition would indicate a pressure of 101 psi.

Essentially, one would desire a 1 psi indicated change for a change of pressure at the negative port of 1 psi. It is, of course, obvious that if the pressure at the negative port does not change but the pressure at the positive port goes from 100 to 90 psi, the output voltage should indicate a pressure of 90 psi. In a similar manner, if the pressure at the negative port changes, the output voltage should indicate this change as described above.

The bridge arrays which consist of resistors R1 to R6 are each associated with a given sensitivity. The sensitivity of the array can be controlled by the manufacturer by well known techniques. The sensitivity is also a function of the resistive values in each of the arrays. Thus, as will be explained, by selecting the sensitivity of the resistors which is the unit pressure change per psi and by selecting the magnitude of the resistors, one can cause the shunted bridge array of FIG. 1 to exhibit a voltage which is always indicative of the pressure applied to the positive port as corrected by or referenced to the pressure applied to the negative port.

Figure 2:
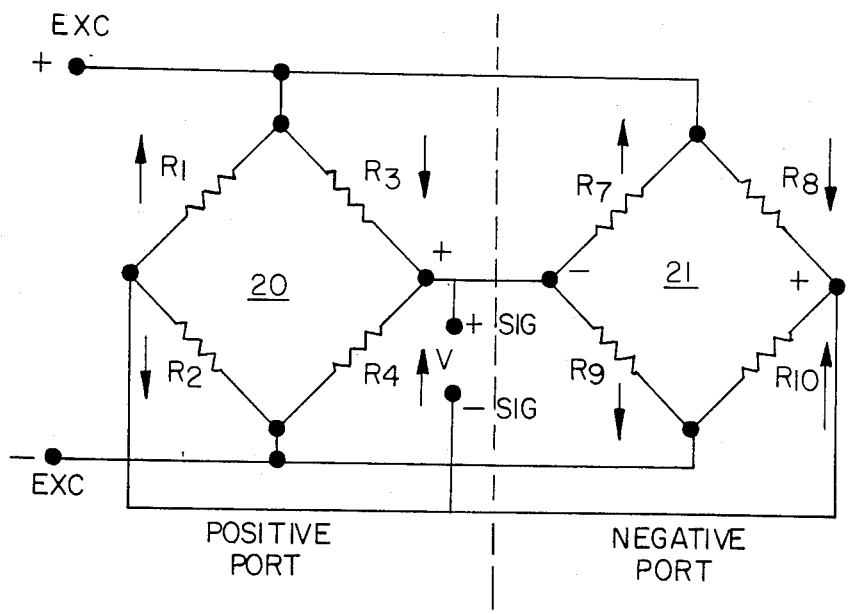
FIG. 2 is a circuit schematic diagram showing an alternate embodiment of a shunted bridge array according to this invention.
Figure 3:
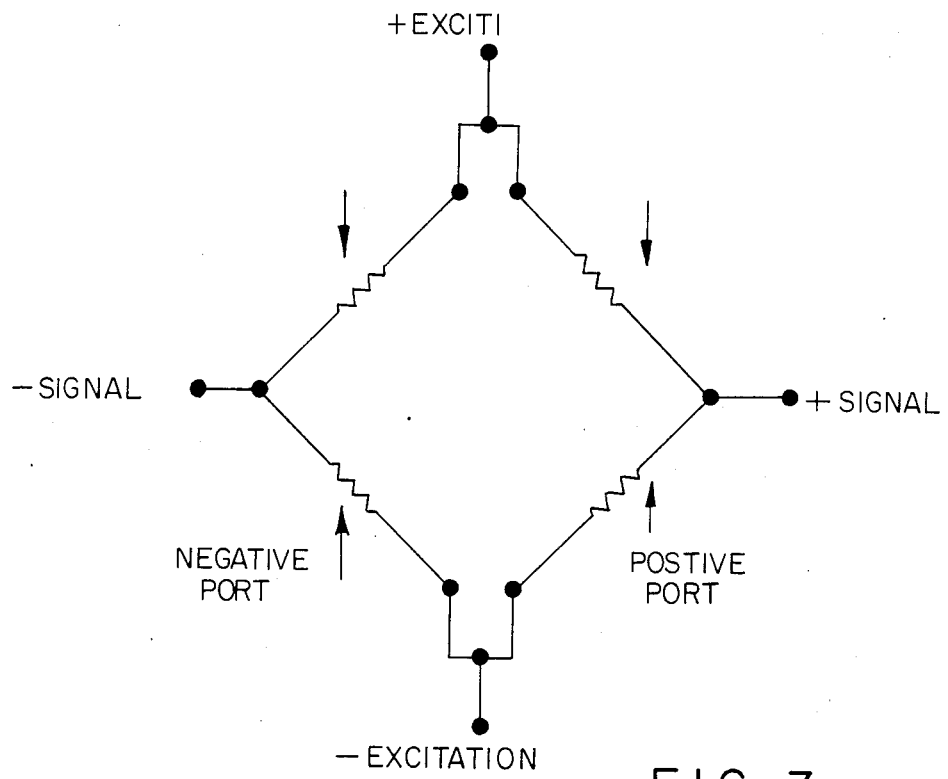
FIG. 3 is a circuit schematic diagram showing an alternate embodiment according to this invention employing two half bridges.

It will be noticed that each resistor in the circuit diagrams of FIGS. 1, 2 and 3 have an arrow associated with it. This arrow points upwards to indicate a bridge arm which increases with increasing pressure applied to the port associated with a particular resistive element. The arrow points downwards to indicate a resistor which decreases in resistance when pressure is applied to its associated port. The circuits as shown provide a correct differential output for the completed instrument.

A typical example will be given to show how the invention works and why it works. For present purposes, assume that the bridge 10 is composed of four equal resistors R1 to R4 which are approximately 500 ohms in value. As indicated, these resistors R1 to R4 are piezoresistive devices where the resistance of each device can be accurately controlled by many known techniques. The fabrication of piezoresistors on suitable diaphragms is well known. For an example, see U.S. Pat. No. 3,935,634 entitled METHODS OF FABRICATING INTEGRATED TRANSDUCER ASSEMBLIES, issued on Feb. 3, 1976 to Anthony D. Kurtz and Joseph R. Mallon, Jr., and assigned to the assignee herein. This patent as well as others describes relevant techniques for fabricating such transducers. In regard to the full bridge array 10, the bridge may be fabricated so that the bridge sensitivity is 1.09 millivolts per psi when not shunted by resistors R5 and R6. The shunting acts to slightly reduce the sensitivity of the composite array, and hence for a change in pressure of 1 psi, the voltage across the unshunted full bridge array will change by 1.09 millivolts for a change of pressure at the positive port of 1.09 psi. The array 10 is designed so that it can monitor pressure magnitudes up to 100 psi. The magnitude of the resistors R5 and R6 are selected to be approximately 5 times greater than resistors R1 and R4. This is convenient since this transducer only has to measure slight pressure variations approximately 15 psia. The magnitude of resistors R5 and R6 are selected to be about 2,500 ohms in value. This value allows the shunted effective senstivity of the array at the positive port to be identical to the shunted sensitivity at the positive port. This sensitivity is 1.0 millivolts/psi.

Accordingly, these resistors will exhibit a sensitivity of 6.0 millivolts/psi when tested as a ½ bridge, that is the same in terms of resistance change as a full bridge sensitivity of 12 millivolts/psi. As one can see from FIG. 1, the effective resistance of the right side of the bridge 10 is determined by the parallel combination of resistors R3 and R5 with resistors R4 and R6. Since all resistors in the parallel combination are pressure sensitive, the magnitude of the parallel combination changes according to a change in resistance in either bridge circuit. As one can ascertain, the output voltage of the bridge is a function of the parallel combination of R4 and R6 divided by the sum of the parallel combination of R3 and R5 plus R4 and R6. For the resistor and sensitivity values indicated, the composite array will produce a difference in signal of 1 millivolt/psi if the pressure is changed either at the front (positive) or at the rear (negative) port.

Hence by selecting the values of resistors R5 and R6 with respect to the resistors R1 and R4, one obtains an output voltage which is the voltage at the positive port as modified by the voltage at the negative port.

The mathematics for selecting the resistors to obtain the requisite output voltage for the circuit of FIG. 1 is easily implemented and is shown in the APPENDIX attached hereto. Thus, the bridge configuration shown in FIG. 1 will produce an output voltage which will be corrected according to the pressure applied to the negative port. Hence as one can see from the mathematics, by proper selection of the resistor magnitude and the sensitivity of the resistors, one will now obtain an output voltage from the bridge circuit of FIG. 1 which is as always referenced to the ambient pressure. It is noted that arranging the circuit and relative sensitivities of the two arrays as indicated is very advantageous. It is quite difficult in general to match two bridges or half bridge sensitivities exactly. To the extent that the sensitivity of the positive and negative ports differs the transducer will not respond accurately. For instance, if two half bridges of equal sensitivity were employed, a 2 percent error in sensitivity would result in an error of 2 percent of the pressure applied to the reference port. The circuit shown reduces this error by a factor of 11. Thus an economic and simple circuit allows what is otherwise a difficult integration of two transducers into a single instrument.

As indicated above, if the pressure at the positive port is now 100 psia or 115 psia and the pressure at the negative port is 15 psia or or 0 psia, the voltage at the output of the transducer will indicate a pressure of 100 psia. If the voltage at the negative port is 14 psia, the voltage of the transducer will indicate a pressure of 101. If the voltage at the negative port changes to 16 psi, the voltage of the transducer will indicate a voltage of 99 psi and so on. This relationship is maintained through the entire range of the transducer by the selection of the resistance magnitudes and sensitivities as shown mathematically in the APPENDIX.

It is noted that this circuit is unique and has the advantage that essentially the full output signal is obtained from the full bridge array at the positive port. If two trandsucers are used in the absence of amplifier, bridges might be connected to half bridges. The bridge at the negative port only serves to correct for ambient pressre, and results in one half of the output being lost because only one half of bridge is used. Such a circuit is shown in FIG. 3. While this circuit is very effective, it does not provide the full sensitivity as is available with the circuit of FIG. 1.

The full bridge circuit 10 gives one a maximum output for the main source of pressure being monitored, and hence by using a full bridge array, one obtains twice the voltage as would be available by a half bridge array. The circuit eliminates all external circuits such as operational amplifiers which were necessary in the prior art properly combining outputs of two separate bridge arrays to obtain a single output voltage which is corrected by a reference voltage applied to a negative port. The structure allows one to utilize two separate transducer structures where the respective piezoresistors are isolated from the pressure transmitting environment. Moreover, these transducers do not have to be closely matched in sensitivity to achieve a high accuracy.

Referring to FIG. 2, there is shown an alternate embodiment of the above noted invention where a first full bridge array 20 is located at the positive port with a second bridge array 21 located at the negative port. Each bridge as shown in FIG. 2 is a full bridge array. The resistors R7 and R9 of the bridge 21 shunt the resistors R3 and R4 of bridge 20, while R8 and R10 shunt resistors R1 and R2 of the bridge 20. Thus as one can see, the opposing sides of each bridge are shunted by opposing resistors of the other bridge. For example, the positive side of bridge 20 is shunted by resistors in the negative side of the bridge 21 and vice versa.

As is shown in the APPENDIX B, in the configuration of FIG. 2, the resistors in bridge 21 may be selected to be five times the magnitude of the resistors R5 and R6 of FIG. 1. Hence the resistors of bridge 21 are selected to be about 2,500 ohms with resistors in bridge 20 at 500 ohms. Thus the sensitivity of bridge 21 is 6.0 millivolts per psi. The sensitivity of bridge 20 may be selected to be 1.2 millivolts/psi and the sensitivity of the unit will be 1.0 millivolts/psi. The transducer will respond identically to positive and negative pressures. The circuit depicted in FIG. 2 employs a high resistance full bridge circuit 21 which shunts the lower resistance full bridge circuit 20, and therefore this bridge can be of a lower sensitivity for a given resistor value. Alternately, the sensitivity ratio can be held constant and a 5,000 ohm bridge can be used for bridge 21.

This results in slightly better operation regarding second order nonlinearities (because of reduced shunting effects) which are associated with piezoresistive devices. It also allows one to use two fully symmetrical bridge circuits of a well known configuration. As can be seen from the APPENDIX, by proper selection of the resistors, one can, therefore, obtain a voltage output from the bridge which is again indicative of the pressure at the positive port as corrected or referenced to the pressure at the negative port. Both configurations depicted in FIGS. 1 and 2 eliminate the need for complicated external circuits which were necessary in the prior art to combine the separate bridge outputs. It further allows one to use a full bridge array at the positive port to thereby achieve increased voltage outputs per unit pressure change.

Referring to FIG. 3, there is shown a circuit which is composed of two half bridges. Such a circuit, while not allowing the full sensitivity of the circuits shown in FIGS. 1 and 2, can be arranged to provide a similar compensation of the reference pressure. For such a circuit, the sensitivities of all four resistors are arranged to be of the same magnitude and of appropriate sign. Assume that each resistor changes 2 percent for an applied pressure of 100 psi. With a typical excitation of 5 volts and with a full bridge arrangement of four resistors in a right port, the sensitivity would be 1 millivolt/psi. For the circuit shown, the resultant resistor would be 0.5 millivolts/psi or one-half the output of the circuits shown in FIGS. 1 and 2. This invention seeks to provide a simple, reliable and economic structure which can be employed to practically utilize the circuits of FIGS. 1, 2 and 3 in a differential transducer.

Figure 4:
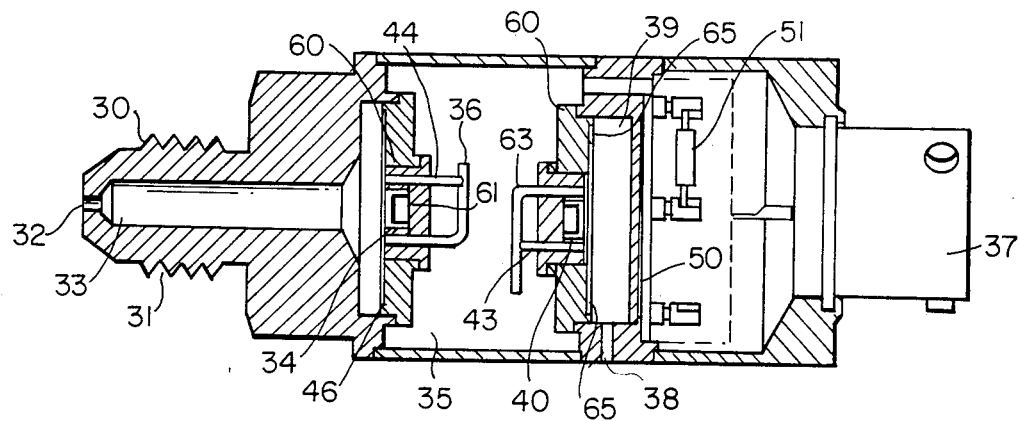
FIG. 4 is a cross sectional view of a mechanical transducer assembly which may be employed in implementing this invention.

Referring to FIG. 4, there is shown a mechanical assembly drawing for a pressure transducer employing two separate transducer assemblies as depicted in FIGS. 1, 2 and 3. Essentially, the transducer structure of FIG. 4 constitutes a housing having a front section 30 of a reduced diameter. The front section 30 has a threaded portion 31 to enable it to be threaded with a suitable aperture so that the input pressure port 32 can interface with a source of presssure to be monitored such as oil pressure in an engine and so on. The input pressure port 32 is the positive port. The housing has an elongated aperture 33 which communicates with port 32 at one end and interfaces with a pressure transducer structure 34 located in a separate cavity within the hollow interior 35 of the transducer assembly.

The other end of the elongated aperture 33 communicates directly with an isolation diaphragm 46. The isolation diaphragm is fabricated to be rather flexible and is typically made from stainless steel and is welded around the peripheral edge of the housing as shown in FIG. 4. In general overlapping spot welding may be employed. The pressure transducer structure 34 is a full pressure transducer of a cup shaped configuration and is secured with a mounting material such as epoxy or Viton rubber to the top surface of a header 61.

Such cup shaped devices are well known in the art and reference is made to U.S. Pat. No. 4,204,185 entitled INTEGRAL TRANSDUCER ASSEMBLIES EMPLOYING THIN HOMOGENEOUS DIAPHRAGMS issued on May 20, 1980 to Anthony D. Kurtz and Richard Weber and assigned to the assignee herein.

As indicated, the pressure transducer structure 34 is a cup shaped device with a full or half bridge array deposited thereon as for example bridge circuit 20 of FIG. 2 or the circuit of FIG. 3 or the full bridge array of FIG. 1. Suitable leads from the transducer structure 34 are coupled to pins 44 and are used to effect electrical connections to the array at the negative port. and eventually are directed to the end connector 37.

There is shown a tube 36. This tube is brazed or glass-to-metal sealed to the header 66 and enables one to fill the internal cavity 60 associated with the transducer with silicon oil or some other pressure transmitting fluid. After filling the cavity 60 with oil, the tube 36 is sealed off, by soldering, welding or other means, and thus the entire transducer structure 34 is surrounded by a pressure transmitting fluid. The oil filled cavity 60 has one end terminated in the isolation diaphragm 46 and the other end closed by the transistor header structure 61.

The negative pressure port 38 is shown and consists of a vent aperture which is located in the side of the transducer structure and essentially communicates with a source of reference pressure such as atmospheric pressure. If the transducer is to be differential rather than gage, a second port similar to the positive port 31 may be secured at the point where the aperture is placed.

The aperture 38 communicates with an internal hollow 39 which interfaces via a second metal isolation diaphragm 65 with a second transducer structure 40. The transducer structure 40 is very similar to the transducer structure 34 which is placed at the positive port and a cup shaped sensor which contains a resistive structure of either a half bridge array of FIG. 1 and FIG. 3 or a full bridge array of FIG. 2.

The transducer structure 40 is also associated with a tube 63 to allow the internal cavity associated with the transducer structure to be filled with oil as for transducer 34. The internal hollow 39 communicates with the transducer structure by means of a stainless steel diaphragm 65 which is also welded by means of a capacitive discharge or other techniques to a housing section 66 associated with the transducer structure. Thus as can be seen from FIG. 4, each pressure transducer assembly is associated with a stainless steel diaphragm as 46 and 65 which diaphragm is welded or otherwise rigidly secured to the housing. In both cases pressure is communicated to the sensor by means of oil or other fluids.

A complete pressure sensor which may be silicon device secured to an associated housing is shown. Each transducer structure is associated with a base plate which forms together with the steel diaphragm an internal hollow or cavity which can be then filled with oil to provide a pressure transmitting environment.

It should be noted that such oil filled transducer structures offer a number of advantages as tradsducers. They allow the use of silicon diaphragm-type pressure sensors which possess many well known advantages in performances and cost over other types of sensors. Such transducers are not media compatible without protection such as is afforded by the metal isolation diaphragm. A disadvantage of this structure, however, is the fact that the oil expands rapidly as the environmental temperature is increased and causes an erroneous indication of pressure. This effect is well-known and may be minimized by employing a very flexible isolation diaphragm. The circuits shown in FIGS. 1–3, however, have an unanticipated advantage with regard to this effect. An analysis has shown that if the transducers are connected in one of the circuits as shown in FIGS. 1, 2, or 3, then the one apparent pressure signal caused by oil expansion will cancel. This makes the use of such a structure significantly easier then if the effect had to be compensated in the usual manner.

Thus as is apparent from the structure of FIG. 4, the sensors as contained in the respective cavities are only exposed to the oil which is a noncontaminating fluid and the presence of the steel diaphragm prevents the oil from leaking out of the transducer or otherwise affecting the external environment as directed via the pressure ports 32 and 38.

Furthermore, the device is such that any water or external fluid which may enter the respective pressure ports or the internal hollow of the transducer are in contact only with the housing structure and the metal isolation diaphragm and, therefore, cannot damage the transducer structures 34 and 40. Thus even if water enters the cavities as 39 and the elongated aperture as 33, it will not permanently damage or contaminate or otherwise affect the transducer operation. All components of the transducer shown are welded and moisture cannot penetrate any port of the structure other than the media compatible areas. This structure is mechanically unique and solves a long standing problem in the use of silicon diaphragms in differential pressure measurement applications.

As can be seen from FIG. 4, each transducer structure as 34 to 40 contains the necessary piezoresistive array where the piezoresistors are further protected from the pressure transmitting environment as located on the opposite of the diaphragms. All connections as shown in FIGS. 1 and 2 between the structures 34 and 40 are implemented via the terminal pins as 43 and 44 emanating from the transducer structure or can be implemented at the connector 37 as is well known. All electrical connections are retained within hermetically sealed portions of the transducer housing.

The assembly contains a further circuit board 50 which may include compensating resistors as 51 for providing individual compensation for each transducer with respect to temperature and other pressure operation. Compensation techniques for full and half bridge arrays are well known in the art. For an example, see U.S. Pat. No. 4,333,349 issued on June 8, 1982 to Joseph R. Mallon, Jr., et al entitled BINARY BALANCING APPARATUS FOR SEMICONDUCTOR TRANSDUCER STRUCTURES. Examples of suitable transducer arrangements for the structures 34 and 40 may be had by reference to U.S. Pat. No. 3,800,264 entitled HIGH TEMPERATURE TRANSDUCER AND HOUSING INCLUDING FABRICATION METHODS issued on Mar. 26, 1974 to A. D. Kurtz and Joseph R. Mallon, Jr.

As one can discern from the APPENDIX, one advantage of the several electrical configuration of the above noted structure is to provide an output voltage from a shunted transducer configuration which voltage is indicative of the pressure applied to a positive port as corrected by the pressure applied to the negative port and to do so while eliminating all external circuitry such as amplifiers as found in the prior art. Hence, by the proper selection of the resistive values together with the associated sensitivity, one automatically obtains a correct voltage reading based on the circuit configurations depicted in FIGS. 1, 2 and 3.

It is also apparent from the above description that each transducer structure may comprise a half-bridge array where two piezoresistors from each bridge circuit, as for example from the positive port and negative port, may be wired together to form a full-bridge arrangement whereby the resistors in the full bridge can be selected to provide the above noted compensation. Such a circuit is shown in FIG. 3.

Figure 5:
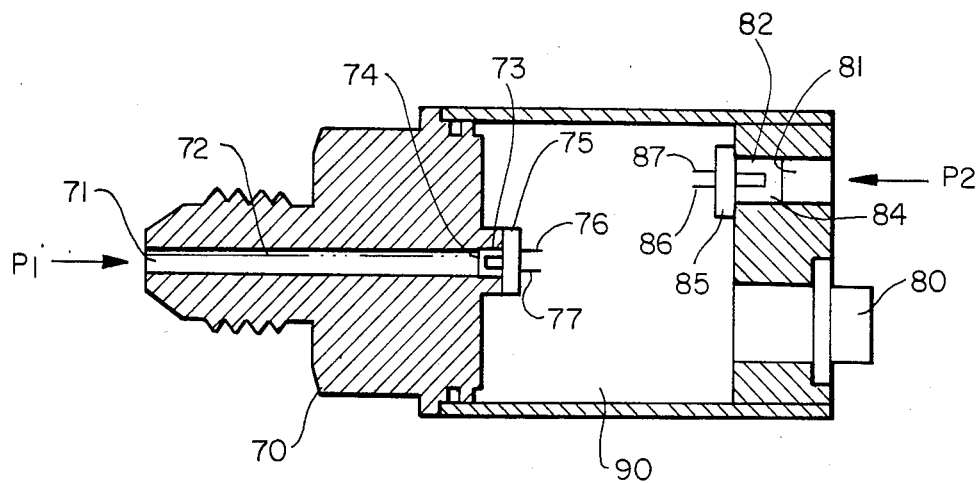
FIG. 5 is a cross sectional view of an alternate embodiment of a pressure transducer assembly according to this invention.

Referring to FIG. 5, there is shown a cross sectional view of a transducer of an alternate embodiment according to this invention.

In FIG. 5 a housing 70 is associated with a first reference input port 71 which has an elongated aperture 72 communicating directly with the top surface of a cup shaped transducer 73. The transducer 73 is contained within a cavity of the housing with the top surface of the transducer coupled to a stainless steel diaphragm 74. The internal cavity of the transducer is again oil filled with a bottom header 75 serving as the bottom plate for the cavity. Leads from the sensor structure are directed to pins as 76 and 77 associated with the header 75 which pins are then directed to the connector 80.

Alternately, a conventional diaphragm with metallic strain gages glass bonded may be employed in this configuration. While such a diaphragm exhibits inferior performance, it can be made conveniently small and is mechanically convenient in some applications.

A second pressure port 81 is also associated with a separate transducer structure 82 which structure is again maintained within a cavity and interfaces with a steel isolation diaphragm 84 and an associated header 85. This cavity again may be oil filled with the sensor leads emanating from transducer 82 coupled to pins 86 and 87 for connecting to the output connector 80. As seen in FIG. 5, the entire structure is completely welded. The pressure port designated by P2 is a reference or vent port, while the pressure port P1 is the primary measuring port. In this manner the pressure transducer 73 may be larger than the pressure transducer 82.

The internal cavity 90 is completely isolated in that all coupling of the parts of the housing 70 are made by suitable welding techniques. If any water accumulates within the cavities 90, it will not contaminate the pressure transducers 73 and 82 due to the fact that they are completely isolated from both the external environment and from the internal cavity 90 of the transducer 70.

In order to provide the above noted compensation, the sensor elements associated with the transducer structures 82 and 74 are also connected as shown for example in FIGS. 1 and 2 and 3. This is an extremely important aspect as the prior art has experienced a great deal of difficulty in compensating such transducers for linear operation based on the problem in providing adequate compensation in an oil filled environment.

Figure 6:
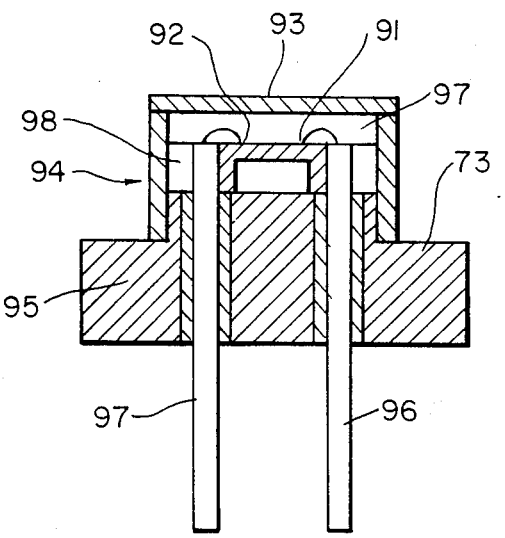
FIG. 6 is a cross sectional view of a particular transducer structure utilized with the configuration of FIG. 4.

Referring to FIG. 6, there is shown an enlarged view of a transducer structure as 73 and 82 of FIG. 5. Essentially, as seen, the transducer structure 92 has a cup-shaped member 91 which is fabricated from silicon with the sensor elements located within the internal cavity of the cup. The top surface of the cup shaped member in hydraulic connection with a metal isolation diaphragm 93 by means of a pressure transmitting fluid. Terminal leads from the sensor elements are directed to pins 96 and 97 associated with the metal header 95 which header acts as a bottom surface. The internal cavity 97 is then oil filled as indicated above.

It will be apparent to those skilled in the art that various modifications can be implemented without departing from the spirit and scope of this invention, and as indicated, according to the claims appended hereto.

APPENDIX A

Circuit analysis for half bridge circuit shown in FIG. 1.

$$\frac{V}{V_E} = \frac{R_1\left(\dfrac{R_4 R_6}{R_4 + R_5}\right) - R_2\left(\dfrac{R_3 R_5}{R_3 + R_5}\right)}{(R_2 + R_1)\left[\dfrac{R_4 R_6}{R_6 + R_4} + \dfrac{R_3 R_5}{R_3 + R_5}\right]}$$

$R_1$, $R_4$, $R_3$ and $R_2$ are transducer gages associated with the positive port and designated as $R_{1-4}$. $R_+$ is the average unstrained value of $R_{1-4}$.

$R_5$ and $R_6$ are tracking gages associated with the negative port and designated as $R_{5-6}$. $R_-$ is the average unstrained value of $R_{5-6}$.

p = applied pressure
$P_o$ = reference pressure
S = gage sensitivity for positive port (ohms/ohm/psi)
$S_o$ = gage sensitivity for negative port (ohms/ohm/psi)

$$R_1 = R_4 = R_+(1 + S(p + P_o))$$

$$R_2 = R_3 - R_+(1 - S(p + P_o))$$

$R_{1-4}$ gages are subjected to both p and $P_o$ pressures $$R_5 = R_-(1 + S_o P_o)$$

$$R_6 = R_-(1 - S_o P_o)$$

$R_{5-6}$ gages see only $P_o$

Ignoring second order terms in $S^2$ and $S_o^2$, the bridge output reduces to $$\frac{V}{V_E} = QP + Q_o P_o$$

$$Q = \frac{R_+ + 2R_-}{2(R_+ + R_-)} S$$

Q = net sensitivity of the circuit (mv/v/psi)

$$Q_o = \frac{(R_+ + 2R_-)S - R_+ S_o}{2(R_+ + R_-)}$$

$Q_o$ = tracking sensitivity (mv/v/psi)
$Q_0$ = zero for ideal tracking
given $R_+$, $R_-$ and S, then:

$$S_o = S\left(1 + \frac{2R_1}{R_+}\right)$$

when the $R_{1-4}$ bridge is tested alone ($R_{5-6} = \infty$) the sensitivity is S = q (mv/v/psi) when the $R_{5-6}$ bridge is tested as a half bridge, its sensitivity is $S_o = 2q_o$ (mv/v/psi)

$$\text{then } Q = \frac{(R_+ + 2R_-)}{2(R_+ + R_-)} q$$

$$Q_o = \frac{(R_+ + 2R_-)q - 2R_+ q_o}{2(R_+ + R_-)}$$

$$\text{choose } q = \frac{2(R_+ + R_-)}{(R_+ + 2R_-)} Q$$

$$\text{and } q_o = \frac{R_+ + R_-}{R_+} Q \text{ for } Q_o = 0$$

Example
$R_+ = 500\Omega$
$R_- = 2500\Omega$
derived Q = 1.0 mv/v/psi then:

$$q = \frac{2(500 + 2500)}{(500 + 5000)} (1.0) = 1.09 \text{ mv/v/psi}$$

$$q_o = \frac{500 + 2500}{500} (1.0) = 6.00 \text{ mv/v/psi}$$

If one cannot choose the correct half bridge sensitivity, $q_o$, then the tracking error E can be computed as follows:

$$E = \text{(tracking error)} = \frac{Q_o P_o}{Q P_m}$$

$P_m$ = full scale pressure $$E = \left[\frac{(R_+ + 2R_-)q - 2R_+ q_o}{(R_+ + 2R_-)}\right] \frac{P_o}{P_m}$$

Example $R_+ = 500$, $R_- = 2500$ q = 1.00 mv/v/psi $$q_o = 4.00 \text{ mv/v/psi}$$

$$P_o = 15 \text{ psi } P_m = 100 \text{ psi}$$

$$E = \frac{5500(1.00) - 1000(4.00)}{5500} \cdot \frac{15}{100} = 4.1\% \text{ of } FSP$$

APPENDIX B

Circuit analysis for full bridge tracking circuit shown in FIG. 2.

Let $R_1 = R_2 = R_3 = R_4 = R_+$
Let $R_7 = R_8 = R_9 + R_{10} = R_-$ $$q = \left(\frac{R_+ + R_-}{R_-}\right) Q \text{ sensitivity of positive port sensor}$$

$$q_o = \left(\frac{R_+ + R_-}{R_+}\right) Q \text{ full bridge sensitivity of tracking sensor at negative port}$$

$$\frac{V}{V_E} = \left(\frac{R_- q}{R_+ + R_-}\right) P + \left(\frac{R_- q - R_+ q_o}{R_+ + R_-}\right) P_o$$

$$E = \left(\frac{R_- q - R_+ q_o}{R_- q}\right) \frac{P_o}{P_m}$$

Example $R_- = 2500$ $R_+ = 500$ Q = 1.0 mv/v/psi $$q = \left(\frac{500 + 2500}{2500}\right) (1.0) = 1.2$$

$$q_o = \left(\frac{500 + 2500}{500}\right) (1.0) = 6.0$$

Hence there is no tracking error.

I claim:

1. A pressure transducer apparatus of the type containing first and second transducer structures each contained in a housing and each associated with a separate pressure port, the improvement in combination therewith of an environmentally protected transducer structure comprising:

a first metal diaphragm secured to a first pressure port to provide a deflectable diaphragm, with a first surface of said metal diaphragm facing said port, with said first transducer structure secured to the opposite surface of said metal diaphragm, with said first transducer surrounded by a pressure fluid accommodating assembly to provide isolation of said transducer structure from said first port, with a second metal diaphragm secured to said second port to provide a deflectable diaphragm with a first surface of said metal diaphragm facing said port, with said second transducer structure secured to the opposite surface of said metal diaphragm, with said second transducer surrounded by a pressure fluid accommodating assembly to provide isolation of said transducer from said second port and means coupling respective sensors of said first and second transducer structures together to form a compensated array where the voltage output is indicative of the pressure applied to one port as referenced to said other port.

2. The transducer apparatus according to claim 1, wherein said first and second transducer assemblies are cup-shaped silicon members generally of a U-shaped cross sectional configuration with the top surface of said U secured to said associated metal diaphragm, with the sensors secured to the opposite side of said top surface and located between the arms of said U-shaped structure with a base plate coupled between the arms of said U-shaped member to enclose said sensors to form an internal cavity, with said cavity adapted to contain said pressure fluid.

3. The transducer apparatus according to claim 2, wherein said pressre fluid is oil.

4. The transducer member apparatus according to claim 3, wherein said metal diaphragm is stainless steel.

5. A pressure transducer apparatus of the type containing first and second transducer structures each coupled to a separate pressure port with each transducer having a deflectable diaphragm upon which is mounted biased pressure sensitive elements for providing a voltage output according to the magnitude of a pressure applied to the associated port, the improvement in combination therewith of apparatus for providing an output voltage indicative of the pressure at said first port as referenced to said second port, comprising:

a first full bridge array mounted on said first diaphragm and having resistive arms with both sides of said array coupled between a bias source and with the midpoints of both sides capable of providing a voltage according to a pressure variation applied to said diaphragm, a second bridge array located on said second diaphragm and having resistive arms, with at least two resistors in corresponding arms each shunting a corresponding one resistor in a side of said first array with the resistors in said second bridge array selected of a magnitude to cause said shunted resistors in said first array to provide a voltage value according to both the pressure applied to both said first and second ports whereby the voltage at said output is indicative of the pressure applied to said first port as referenced to said second port.

6. The pressure transducer according to claim 5, wherein said second array is a half bridge array.

7. The pressure transducer according to claim 5, wherein said resistors of said first and second arrays are piezoresistors.

8. The pressure transducer according to claim 5, wherein said resistors in said second bridge array are substantially greater in magnitude than those in said first array.

9. The pressure transducer according to claim 5, wherein said resistors in said second array have a greater sensitivity with applied pressure than those in said first array.

10. The pressure transducer according to claim 5, wherein said second port associated with said second diaphragm is responsive to atmospheric pressure.

11. The pressure transducer according to claim 5, wherein said first array is capable of responding to substantially higher pressure values than said second array.

12. The pressure transducer according to claim 7, wherein the magnitude of said resistors in said second array are at least five times greater than those of said first array.

13. The pressure transducer according to claim 5, wherein said second array is a full Wheatstone bridge array with the resistors in each side of said second array shunting the resistors in opposite corresponding sides of said first array.

14. A pressure transducer apparatus comprising:

a housing having first and second inlet pressure ports for receiving first and second pressures a first transducer assembly having a diaphragm communicating with said first port and having disposed thereon a first full Wheatstone bridge array of pressure sensitive resistors capable of exhibiting a varying resistance according to the magnitude of a pressure applied to said first port to provide a varying output voltage at the bridge midpoint upon application of a bias potential to said array, a second transducer assembly having a diaphragm communicating with said second port and having disposed thereon a second bridge array of pressure sensitive resistors capable of exhibiting a varying resistance according to the magnitude of a pressure applied to said second port, with at least two resistors of said second array in shunt with at least two resistors of said first array, with the value of said two resistors in said second array selected to be larger than the value of said shunted resistors in said first array and exhibiting a larger sensitivity per unit of applied pressure whereby the voltage at the midpoint of said first bridge array is indicative of any pressure variation applied to said first port as referenced to that pressure applied to said second port.

15. The pressure transducer apparatus according to claim 14, wherein said first full Wheatstone bridge array of pressure sensitive resistors is a piezoresistive array.

16. The pressure transducer apparatus according to claim 14, wherein said second bridge array is a half bridge array comprising first and second piezoresistors, with said first resistor in shunt with one resistor in one arm of said first array and said second resistor in shunt with another resistor in another arm of said first array.

17. The pressure transducer apparatus according to claim 14, wherein the magnitude of said resistors of said second array being at least 3 times greater than the magnitude of said resistors in said first array.

18. The pressure transducer apparatus according to claim 14, wherein the sensitivity of said resistors in said second array is at least 3 times greater than those in said first array.

19. The pressure transducer apparatus according to claim 14, wherein said first port is a positive pressure port with said second port being a negative reference port.

20. The pressure transducer apparatus according to claim 14, wherein said second array is a full Wheatstone bridge array with the resistors in each side shunting resistors in the opposite side of said first array.

21. A pressure transducer apparatus of the type containing first and second transducer structures each contained in a housing and each associated with a separate pressure port, the improvement in combination therewith of an environmentally protected transducer structure comprising:

a first member secured to a first pressure port to provide a first deflectable diaphragm, with a first surface of said first diaphragm facing said port, with said first transducer structure secured to the opposite surface of said diaphragm, with said first transducer surrounded by a pressure fluid accommodating assembly to provide isolation of said transducer structure from said first port, with a second member secured to a second pressure port to provide a second deflectable diaphragm with a first surface of said second diaphragm facing said port, with said second transducer structure secured to the opposite surface of said second diaphragm, with said second transducer surrounded by a pressure fluid accommodating assembly to provide isolation of said transducer from said second port and means coupling respective sensors of said first and second transducer structures together to form a compensated array where the voltage output is indicative of the pressure applied to one port as referenced to said other port.

22. The apparatus according to claim 1 wherein each of such first and second transducer structures contains a half bridge array.

23. The apparatus according to claim 21 wherein each of such first and second transducer structures contains a full bridge array.

24. The apparatus according to claim 21 wherein said first transducer includes a full bridge array with said second transducer including a half bridge array.

* * * * *